United States Patent Office 3,294,651
Patented Dec. 27, 1966

3,294,651
MONOMERIC ACRYLONITRILE EXTRACTION OF DIMETHYLFORMAMIDE FROM POTASSIUM SALT COAGULATION BATH SOLUTIONS
Alberto Pasin, Cesano Maderno, Italy, assignor to Snia Viscosa Societá Nazionale Industria Applicazioni Viscosa S.p.A., Milan, Italy, a company of Italy
No Drawing. Filed Oct. 16, 1963, Ser. No. 316,537
Claims priority, application Italy, Oct. 22, 1962, 676,624
9 Claims. (Cl. 203—39)

The object of the present invention is a more economical method for the recovery of dimethylformamide from coagulating baths on the base of highly concentrated aqueous solutions of a salt constituted by potassium acetate or formate, said novel method consisting in using as an extracting medium monomeric acrylonitrile.

It may be stated that the novel method shows a considerable interest, chiefly in the case where one resorts simultaneously to the use of a coagulating bath constituted by concentrated aqueous solutions of potassium acetate or formate and to a polymerizing method consisting in polymerizing directly monomeric acrylonitrile, either alone or else in admixture with other monomeric substances, in dimethylformamide; the advantages of said method will be disclosed hereinafter.

Methods for polymerizing acrylonitrile in dimethylformamide are already disclosed in applicant's Italian Patent No. 501,674 and Italian patent applications No. 4,499, dated June 21, 1960, and No. 8,675, dated December 5, 1960.

Wet spinning methods for spinning polyacrylonitrile dissolved in dimethylformamide and coagulated in baths on the base of concentrated potassium acetate and formate solutions are already known by Courtauld's British Patent 706,263, dated March 24, 1954, as concerns the acetate and applicant's U.S. Patent No. 3,073,670 as concerns the formate.

Methods for the extraction of dimethylformamide from baths of potassium acetate by means of methylene chloride have also been disclosed in Courtauld's British Patent 715,939, dated March 22, 1954, while the similar extraction from baths of potassium formate by means of methyl and ethyl esters of formic acid and acetic acid and their mixtures with methylene chloride is disclosed in the U.S. Patent No. 3,086,050.

It is also a known fact that the recovery of dimethylformamide with such extract on agents is expensive and that the high costs have a substantial reflection on the price of the unit of weight of the yarn obtained.

This high cost is ascribable to the considerable amounts of dimethylformamide and of the extracting reagent which are lost both during the first stage of their separation by distillation under atmospheric pressure and during the second stage by the distillation in vacuo of the crude and colored dimethylformamide. This final distillation is essential in view of obtaining a colorless dimethylformamide which is sufficiently pure to be rised for the acrylonitrile polymerization.

These drawbacks are eliminated by the method according to the invention which allows to remove the two following operation steps:

(1) The separating step providing the distillation under atmospheric pressure of the dimethylformamide from the extracting agent, because the mixture of dimethylformamide and acrylonitrile obtained may serve directly for the acrylonitrile polymerization by conventional methods. In fact, by suitably adjusting during the extracting step the ratio between the amount of coagulating bath and the amount of acrylonitrile, it is possible to obtain the desired ratio between the components of the acrylonitrile and dimethylformamide mixture to suit to the requirements of polymerization.

In the present case, the losses of dimethylformamide and acrylonitrile ascribable to the distillation are thus avoided and furthermore there are economized the calories otherwise required for the evaporation and also of the amount of energy required for the condensation of substantial amounts of solvents.

(2) The step constituted by the distillation in vacuo of the crude and colored dimethylformamide obtained from the first distillation because the mixture of acrylonitrile and of dimethylformamide extracted at room temperature is obtained substantially colorless and sufficiently pure and may be reused directly for the acrylonitrile polymerization.

Any possible traces of impurities can be readily removed by causing the mixture to flow through towers filled with carbon granules, or with demineralized ion-exchanging resins for the removal of possible traces of salts.

In the present case, the losses of dimethylformamide ascribable to the distillation in vacuo are avoided and energy required for distilling and condensing the product is economized again.

Yet the elimination of these two steps shows clearly the economy resulting from the use of the method according to the invention.

Even if, after a certain operating time, the impurities accumulated in the bath enter the mixture and consequently contaminate and colour said mixture, it is sufficient to carry out a distillation with a plateless column for obtaining a perfectly colorless mixture suitable for polymerization. In such a case, the treatment with a dry salt for the elimination of the water is not necessary since the latter may be removed by distilling it as an azeotropic mixture with acrylonitrile.

In the exhausted bath, there remain small percentages ranging between 0.2 and 3% of acrylonitrile which are readily removed through distillation as a low boiling azeotrope with the water present in the mixture.

In the extracted mixture of acrylonitrile and dimethylformamide, there remain variable amounts of water ranging between 0.3 and 10%. The amount of water is the higher, the higher is the concentration of the dimethylformamide in the extracted mixture.

Said amount of water may however be diminished to a percentage of 2 to 2.5% by salting, or with anhydrous potassium acetate or with formate. The anhydrous salts are added in amounts proportional to the water contained in the mixture so that the saturated solutions of the corresponding salts may separate themselves as a bottom layer.

The invention will now be illustrated by the following examples:

Example 1

A coagulating bath weighing 1,000 gr. containing 49.60% of potassium formate, 35.40% of water and 15% of dimethylformamide and having a specific gravity of 1.3290 at 20° C. is stirred in a separating funnel with 80 gr. of distilled acrylonitrile. After 60 seconds staying, the liquid separates into two layers, to wit: an upper layer weighing 165 gr. and containing by weight:

| | Percent |
|---|---|
| $H_2O$ | 6.01 |
| Acrylonitrile | 45.25 |
| Dimethylformamide | 48.76 | and a lower layer weighing 915 gr. and containing by weight:

| | Percent |
|---|---|
| Acrylonitrile | 0.58 |
| Dimethylformamide | 7.60 |
| A 58.7% solution of potassium formate | 91.82 |

In order to diminish the percentage of water, the 165 gr. of the upper layer are stirred with 30 gr. of dry potassium formate until a complete dissolution of the salt is obtained, whereafter the mixture is allowed to stay until its separation into two other layers, to wit: an upper layer weighing 159 gr. and containing by weight:

| | Percent |
|---|---|
| Acrylonitrile | 46.93 |
| Dimethylformamide | 50.61 |
| $H_2O$ | 2.46 | and a lower layer weighing 36 gr. and containing 30 gr. of salt and 6 gr. of water.

This second layer is mixed with the first-mentioned lower layer and after removal of the acrylonitrile and suitable dilution, it is recycled into the spinning process.

On the other hand, the upper layer is at first purified by flowing through carbon granules or demineralized resin or eventually it is distilled from a retort and then recycled for polymerization.

Calculation relating to the results of this extraction shows that the coefficient of distribution of the dimethylformamide between the aqueous solution of potassium formate and the acrylonitrile is equal to about 6.2 while the percentage of extracted dimethylformamide is equal to 53.5% of the dimethylformamide present in the original bath.

Example 2

The procedure is the same as in Example 1 except that the 1000 gr. of coagulation bath are stirred with only 40.5 gr. of acrylonitrile. After 80 seconds, the mixture separates into two layers, an upper layer weighing 95 gr. and containing by weight:

| | Percent |
|---|---|
| $H_2O$ | 6.10 |
| Acrylonitrile | 35.05 |
| Dimethylformamide | 58.85 | and a lower layer weighing 945.5 gr. and containing by weight:

| | Percent |
|---|---|
| Acrylonitrile | 0.76 |
| Dimethylformamide | 9.94 |
| A 58.5% solution of potassium formate | 89.30 |

In order to reduce the percentage of water, the 95 gr. of the upper layer are stirred with 25 gr. of dry potassium formate until a separation into two further layers is obtained; an upper layer weighing 92.4 gr. and containing in percentages by weight:

| | Percent |
|---|---|
| $H_2O$ | 3.45 |
| Acrylonitrile | 37.12 |
| Dimethylformamide | 59.43 | and a lower layer weighing 27.5 gr. constituted by 25 gr. of salt and 2.6 gr. of water.

Calculation relating to said extraction shows that the distribution coefficient is equal to about 6 and that the percentage of extracted dimethylformamide corresponds to about 35.4% of that present at the start.

Example 3

1000 gr. of a coagulation bath containing 48.45% of potassium acetate, 36.55% of water and 15% of dimethylformamide and showing a specific weight of 1.2450 at 20° C. are stirred in the same manner and with the same amount of acrylonitrile as in Example 1.

After 70 seconds, the mixture separates into two layers; an upper layer weighing 110 gr. and containing by weight:

| | Percent |
|---|---|
| $H_2O$ | 5.09 |
| Acrylonitrile | 53.09 |
| Dimethylformamide | 41.82 | and a lower layer weighing 970 gr. and containing by weight:

| | Percent |
|---|---|
| Acrylonitrile | 2.33 |
| Dimethylformamide | 10.72 |
| A 57.5% solution of potassium acetate | 86.95 |

In order to reduce the percentage of water, the 110 gr. of the upper layer are stirred with 10 gr. of anhydrous potassium acetate until the salt has completely dissolved and until separation into two further layers is obtained, to wit: an upper layer weighing 106.5 gr. and containing by weight:

| | Percent |
|---|---|
| $H_2O$ | 1.96 |
| Acrylonitrile | 54.83 |
| Dimethylformamide | 43.21 | and a lower layer weighing 13.5 gr. constituted by 10 gr. of salt and 3.5 gr. of water.

The process is then continued as in Example 1.

Calculation relating to said extraction shows that the coefficient of distribution of the dimethylformamide between the aqueous solution of potassium acetate at 57% and the acrylonitrile is equal to about 4 while the amount of extracted dimethylformamide corresponds to 30.66% of the dimethylformamide at the start.

Example 4

The same amount of coagulation bath is used as for Example 3 and is treated with an amount of acrylonitrile equal to that used in Example 2.

After a period of 150 seconds, two layers are obtained; an upper layer weighing 23.5 gr. and comprising in amounts by weight:

| | Percent |
|---|---|
| $H_2O$ | 6.63 |
| Dimethylformamide | 47.37 |
| Acrylonitrile | 46.00 | and a lower layer weighing 1.017 gr. and constituted by:

| | Percent |
|---|---|
| Acrylonitrile | 2.92 |
| Dimethylformamide | 13.65 |
| A 57% saline solution of potassium acetate | 83.43 |

The upper layer weighing 23.5 gr. is treated with 5 gr. of dry potassium acetate and is stirred therewith in order to reduce the percentage of water in said layer, until the salt is completely dissolved whereafter the mixture is allowed to stay until it separates into two further layers, to wit: an upper layer weighing 22.30 gr. and comprising in amounts by weight:

| | Percent |
|---|---|
| $H_2O$ | 1.61 |
| Acrylonitrile | 48.43 |
| Dimethylformamide | 49.96 | and a lower layer weighing 6.2 gr. and constituted by 5 gr. of salt and 1.2 gr. of water.

The process is continued then as in Example 1.

Calculation relating to said extraction shows that the distribution coefficient is equal to 3.5 while the percentage of extracted dimethylformamide corresponds to 7.4% of dimethylformamide present at the start.

Comparison between the results of the extraction according to Examples 1 and 2 and those according to Examples 3 and 4 shows the considerable advantage of the method resorting to potassium formate since as a consequence of the higher coefficient of distribution, there are extracted under similar operative conditions higher percentages of dimethylformamide.

It will be readily understood that the present invention is by no means limited to the examples given hereinabove and that it covers all the modifications thereof falling within the scope of the accompanying claims and which may be executed by anyone skilled in the art. Such modifications relate for instance to the ratio between the amounts of coagulation bath and of acrylonitrile used or to the ratio between the percentages of water contained in the salt solutions and the percentages of dimethylformamide contained in the various coagulation baths, provided that modifications are consistent with the conditions of coagulation. Of course, the method may be extended also to the recovery of other solvents used for the direct polymerization of acrylonitrile.

The accompanying claims are intended also to cover the use of other coagulation baths having as a base calcium chloride and other salts.

Furthermore, instead of extracting in a single stage, it may be sometimes more economical to perform the extraction in two or more successive stages.

I claim:

1. A method for recovering dimethylformamide from coagulation and stretching baths used for the wet spinning of polyacrylonitrile and constituted by a mixture of said solvent with a concentrated aqueous solution of one of the following potassium salts; potassium formate and acetate, consisting in mixing said bath with monomeric acrylonitrile, allowing the mixture to stay for obtaining two layers the lower of which contains the potassium salt and the upper of which contains the major fraction of the solvent with the major part of the monomeric acrylonitrile, and removing said upper layer.

2. A method for recovering dimethylformamide from the coagulation and stretching baths used for the wet spinning of polyacrylonitrile and constituted by a mixture of said solvent with a concentrated aqueous solution of one of the following potassium salts: potassium formate and acetate, consisting in mixing said bath with monomeric acrylonitrile at room temperature, allowing the mixture to stay at room temperature for obtaining two layers the lower of which contains the potassium salt and the upper of which contains the major fraction of the solvent with the major part of the monomeric acrylonitrile, and removing said upper layer.

3. A method for recovering dimethylformamide from the coagulation and stretching baths used for the wet spinning of polyacrylonitrile and constituted by a mixture of said solvent with a concentrated aqueous solution of one of the following potassium salts: potassium formate and acetate, consisting in mixing said bath with monomeric acrylonitrile, allowing the mixture to stay for obtaining two layers the lower of which contains the potassium salt and the upper of which contains the major fraction of the solvent with the major part of the monomeric acrylonitrile, removing said upper layer, reducing the amount of water in it by introducing into it in an anhydrous state the same potassium salt as that contained in said bath and allowing the salt solution to settle itself under the said upper layer.

4. A method for recovering dimethylformamide from the coagulation and stretching baths used for the wet spinning of polyacrylonitrile and constituted by a mixture of said solvent with a concentrated aqueous solution of one of the following potassium salts: potassium formate and acetate, the amount of water in the bath mixture ranging between about 25 and 45% by weight, consisting in mixing said bath with monomeric acrylonitrile, allowing this mixture to stand for separating it into two layers the lower of which contains the potassium salt and the upper of which contains the major fraction of the solvent with the major part of the monomeric acrylonitrile, and removing said upper layer.

5. A method for recovering dimethylformamide from the coagulation and stretching baths used for the wet spinning of polyacrylonitrile and constituted by a mixture of said solvent with a concentrated aqueous solution of one of the following potassium salts: potassium formate and acetate, the amount of solvent in the bath mixture ranging between about 5 and 40%, consisting in mixing said bath with monomeric acrylonitrile, allowing this mixture to stand for separating into two layers the lower of which contains the potassium salt and the upper of which contains the major fraction of the solvent with the major part of the monomeric acrylonitrile, and removing said upper layer.

6. A method for recovering dimethylformamide from the coagulation and stretching baths used for the wet spinning of polyacrylonitrile and constituted by a mixture of said solvent with a concentrated aqueous solution of one of the following potassium salts: potassium formate and acetate, consisting in mixing said bath with monomeric acrylonitrile, allowing this mixture to stand for separating into two layers the lower of which contains the potassium salt and the upper of which contains the major fraction of the solvent with the major part of the monomeric acrylonitrile, removing said upper layer and purifying said upper layer by causing it to flow through an absorbing medium.

7. A method for recovering dimethylformamide from the coagulation and stretching baths used for the wet spinning of polyacrylonitrile and constituted by a mixture of said solvent with a concentrated aqueous solution of one of the following potassium salts: potassium formate and acetate, consisting in mixing said bath with monomeric acrylonitrile, allowing this mixture to stay for separating into two layers the lower of which contains a major fraction of the potassium salt and the upper of which contains the major fraction of the solvent with the major part of the monomeric acrylonitrile, removing said upper layer and mixing again at least once the upper layer with monomeric acrylonitrile to separate any remaining potassium salt.

8. A method for recovering dimethylformamide solvent out of the coagulation and stretching baths used for the wet spinning of polyacrylonitrile and constituted by a mixture of said solvent with a concentrated aqueous solution of one of the following potassium salts: potassium formate and acetate, consisting in mixing said bath with monomeric acrylonitrile, allowing the mixture to stand for separating into two layers the lower of which contains the potassium salt and the upper of which contains the major fraction of the solvent with the major part of the monomeric acrylonitrile, removing said upper layer, and purifying the upper layer by a simple distillation.

9. A method for recovering dimethylformamide from the coagulation and stretching baths used for the wet spinning of polyacrylonitrile and constituted by a mixture of said solvent with a concentrated aqueous solution of one of the following potassium salts: potassium formate and acetate, consisting in mixing said bath with monomeric acrylonitrile, allowing the mixture to stay for separating into two layers the lower of which contains the potassium salt and the upper of which contains the major fraction of the solvent with the major part of the monomeric acrylonitrile, removing said upper layer, and distilling off the upper layer as an azeotropic mixture of water and the acrylonitrile being present in said upper layer.

References Cited by the Examiner

UNITED STATES PATENTS

| | | | |
|---|---|---|---|
| 2,602,817 | 7/1952 | Helder | 260—705 X |
| 2,649,481 | 8/1953 | Caldwell | 264—182 X |
| 2,902,335 | 9/1959 | Sakurai | 264—182 X |
| 3,073,673 | 1/1963 | Notarbatolu | 264—182 |

NORMAN YUDKOFF, *Primary Examiner.*

J. B. DONIHEE, *Assistant Examiner.*